May 10, 1966  T. D. ERNST  3,250,138
AUTOMOTIVE DUST COVERS
Filed March 27, 1964
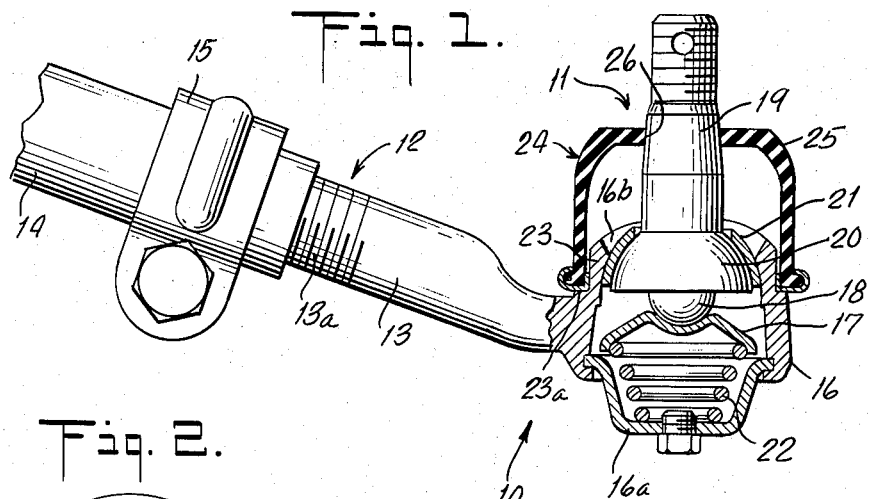
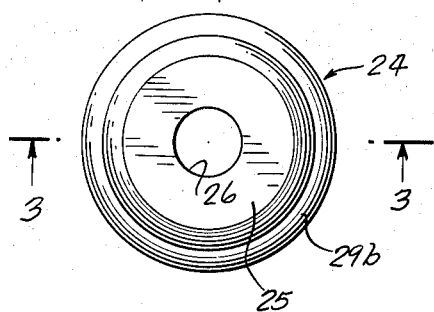
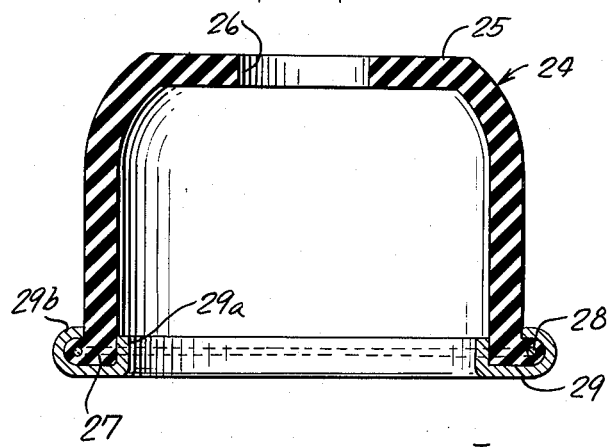
INVENTOR:
THEODORE D. ERNST
BY
Robert Henderson
ATTORNEY United States Patent Office 3,250,138
Patented May 10, 1966

3,250,138
AUTOMOTIVE DUST COVERS
Theodore D. Ernst, Rochester, N.Y., assignor to Garlock Inc., Palmyra, N.Y., a corporation of New York
Filed Mar. 27, 1964, Ser. No. 355,303
3 Claims. (Cl. 74—18.1)

This invention relates to dust covers for articulated joints, for example to dust covers for use on such joints of automotive vehicles.

Where dust covers according to this invention are employed in automotive vehicle steering mechanisms, they are positioned about the ball and socket joints between the respective knuckle studs and the adjacent ends of the intermediate tie rod to prevent entry of foreign particles and loss of lubricant.

One type of known dust cover is a flexible, generally cup-shaped structure of natural or synthetic rubber, a hole or opening being provided in the closed end web of the cup to accommodate the knuckle stud with a tight fit, and a hollow metal ring or annular shoe being secured to and about the open end rim or foot of the cup, this shoe being dimensioned so as to enable it to be press-fitted onto a correspondingly dimensioned exterior shoulder or seat portion of the ball and socket joint casing. In this type of dust cover, the shoe is generally secured to the rim or foot of the cup either by being bonded thereto or by being crimped thereonto.

Though the mentioned bonded shoe arrangement provides relatively good adhesion between the metal and rubber, it suffers from the disadvantage that it is difficult to manufacture without flash interference on the inner diameter of the metal, i.e. on that surface of the shoe which is ultimately to engage the exterior of the ball and socket joint casing. The crimped-on shoe arrangement, on the other hand, though being free of the flash problem, is frequently unsatisfactory in that under severe or repeated stresses the rubber may be pulled out of the metal shoe, thus breaking the seal.

It is an important object of the present invention, therefore, to provide a dust cover construction for articulated joints which is free of the disadvantages and drawbacks of the known constructions of this type.

Another object of the present invention is the provision of a novel dust cover for use on steering knuckles of automotive vehicles.

Still another object of the present invention is the provision of such a dust cover in which the possibility of the flexible rubber sleeve being pulled out of the associated metal shoe is effectively eliminated.

The foregoing and other objects, characteristics and advantages of the present invention will be more clearly understood from the following detailed description thereof when read in conjunction with the accompanying drawing, in which:

FIGURE 1 is a partly sectional, fragmentary elevational view of an automotive steering knuckle and tie rod employing a dust cover constructed in accordance with the principles of the present invention.

FIG. 2 is a plan view of such a dust cover as seen from one end thereof.

FIG. 3 is a sectional view taken along the line 3—3 in FIG. 2.

Referring now more particularly to the drawing, the articulated joint portion 10 of an automotive steering linkage illustrated in FIG. 1 comprises a knuckle 11 and a tie rod 12, the latter being composed of a pair of tie rod ends 13 (only one is shown) externally threaded at 13a, and an intermediate sleeve-like tie rod member 14 which is internally threaded (not shown) at its opposite ends. Generally the member 14 is also longitudinally split (not shown) and a pair of clamping straps 15 (only one is shown) extend about its end regions to enable the sleeve 14 to be tightened and clamped on the tie rod ends 13 when the latter have been threaded into the sleeve to the desired extent.

Each knuckle 11 (only one is shown) comprises a hollow extension 16 of the associated tie rod end 13 within which is arranged a seat member 17 provided with a central spherical depression adapted to receive the ball shaped end 18 of a steering knuckle stud 19. An oppositely spherically curved portion 20 of the knuckle stud 19 is received within a correspondingly contoured bearing member 21 arranged adjacent the top of the hollow extension 16, and a spring 22 interposed between the seat member 17 and the base 16a of the housing biases the seat member upwardly so as to maintain it against the ball portion 18 and so as to maintain the outer surface of the bearing member 21 in contact with the inner surface of the extension 16.

The portion 23 of the tie rod end extension 16, adjacent its open end 16b through which the knuckle stud 19 extends, is generally cylindrical in outline and constitutes the element to which the dust cover 24 is secured. In accordance with the present invention, the dust cover 24 is an essentially cup-shaped structure in the transverse "closed" end web 25 of which is provided an opening 26 adapted to receive an intermediate portion of the knuckle stud 19 with a tight fit.

It will be understood, of course, that the dust cover need not be precisely cylindrical as illustrated in FIGS. 1 and 3 but could have, for example, a pleated configuration or be otherwise contoured, say frusto-conically. The annular rim or foot 27 of the dust cover 24 at the "open" bottom end thereof is shaped to provide a radially outwardly extending flange within the mass of which is encased a non-compressible ring or like stiffening element 28 which may be made of metal, e.g. steel, or any other material capable of functioning in the same manner, as more fully set forth hereinafter.

The entire foot 27 is confined in an annular, rigid, preferably metal shoe 29 which, as clearly shown in FIG. 3, has a cylindrical portion 29a located at the interior boundary surface of the foot end of the dust cover 24, and an annular, rolled-in lip portion 29b overlying the radial flange of the foot 27 at the exterior boundary surface of the dust cover.

In production, the ring 28 is incorporated in the foot 27 of the cup-shaped dust cover 24 during the molding thereof, and the shoe 29 is thereafter mechanically closed over the foot of the dust cover until it assumes the shape illustrated. The inner diameter of the cylindrical portion 29a of the shoe 29 is such that it can be mounted with a tight press-fit onto the cylindrical section 23 of the tie rod end extension 16. At the same time, the outer diameter of the ring 28 is greater than the inner diameter of the shoe portion 29b.

When the so-constructed dust cover is installed, with the knuckle stud 19 tightly received in the hole 26, the shoe 29 is, as previously stated, press-fitted onto the cylindrical section 23 of the tie rod end extension 16 until the bottom of the shoe abuts against an external annular shoulder or seat 23a provided at the base of the section 23. Thereafter, even should the flexible dust cover 24 be subjected to considerable distortion and stresses during relative movement between the knuckle stud 19 and the tie rod 12, the non-compressible ring or stiffening element 28, to and about which the foot of the dust cover is bonded, prevents the rubber from being pulled out of the shoe 29.

It should be noted at this point that wherever the ultimate conditions of use or installation do not entail the passage of a rod or like element through the dust cover, the hole 26 may be omitted and the part 25 of the cover made imperforate. In all other respects such a modified dust cover would be identical to the one illustrated in the drawing. Moreover, in any dust cover according to the present invention, the foot 27 thereof need not necessarily have the outwardly flanged cross-sectional shape illustrated; but the shoe 29 must have a part suitably positioned to prevent the ring or stiffening element 28, and thus the foot 27, from being pulled out of the shoe.

The term "rubber" which is used herein to designate the material of which the dust cover 24 is made, is, of course, intended to encompass not only natural rubber, but also synthetic rubbers and rubbery compositions or polymers, the only requirement being that these be compounded and cured so as to be able to withstand the adverse environmental conditions which they will normally encounter when used in automotive steering linkages.

It should be observed that the inventive concept disclosed herein may be practiced in various other ways without departing from the invention as set forth in the following claims.

I claim:

1. A unitary dust cover for an articulated joint, said cover comprising a flexible-rubber, cup-shaped member terminating at its bottom end in a circular foot having a radially outwardly extending flange; a rigid, annular, channel-shaped shoe substantially occupied by said foot and flange; and a circular, non-compressible, stiffening element fixed to said flange in coaxial relation thereto; said shoe having an annular lip portion coaxially overlying said flange and stiffening element and extending radially inwardly to a diameter, at its inner edge, less than the outside diameter of said stiffening element; and said shoe and the rubber of said foot and flange coacting with said stiffening element to hold the latter close enough to its mentioned coaxial relation to said lip portion to prevent said foot from being pulled out of said shoe.

2. A unitary dust cover according to claim 1, said stiffening element being embedded in said flange.

3. A unitary dust cover according to claim 1, said stiffening element being a metal ring.

References Cited by the Examiner

UNITED STATES PATENTS

| | | | |
|---|---|---|---|
| 755,180 | 3/1904 | Smith et al. | 277—212 |
| 1,956,844 | 5/1934 | Wheeler | 277—94 |
| 2,056,418 | 10/1936 | Coberly | 277—235 |
| 2,288,160 | 6/1942 | Flumerfelt. | |
| 2,559,857 | 7/1951 | Edwards. | |
| 2,720,404 | 10/1955 | Saywell | 277—94 |
| 2,845,285 | 7/1958 | Cobb | 277—94 |
| 3,004,786 | 10/1961 | Herbenar. | |

CARL W. TOMLIN, *Primary Examiner.*

THOMAS F. CALLAGHAN, *Examiner.*

A. V. KUNDRAT, *Assistant Examiner.*